(12) United States Patent
Beeson

(10) Patent No.: US 6,600,597 B2
(45) Date of Patent: Jul. 29, 2003

(54) PHOTONIC CRYSTAL AMPLIFIER FOR OPTICAL TELECOMMUNICATIONS SYSTEM

(75) Inventor: Robert J. Beeson, Catonsville, MD (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/020,265

(22) Filed: Dec. 14, 2001

(65) Prior Publication Data

US 2002/0131162 A1 Sep. 19, 2002

Related U.S. Application Data

(60) Provisional application No. 60/277,218, filed on Mar. 19, 2001.

(51) Int. Cl.[7] .............................. H01S 3/00; H01S 3/16
(52) U.S. Cl. ........................................ 359/342; 372/41
(58) Field of Search .................... 394/342; 385/125; 372/41

(56) References Cited

U.S. PATENT DOCUMENTS

| 5,561,547 | A | 10/1996 | Keirstead et al. |
|---|---|---|---|
| 5,784,400 | A | 7/1998 | Joannopoulos et al. |
| 5,802,236 | A | 9/1998 | DiGiovanni et al. |
| 6,097,870 | A | 8/2000 | Ranka et al. |
| 6,175,671 | B1 | 1/2001 | Roberts |
| 6,301,421 | B1 | 10/2001 | Wickham et al. |
| 6,334,019 | B1 * | 12/2001 | Birks et al. ................. 385/125 |
| 6,496,632 | B2 * | 12/2002 | Borrelli ..................... 385/123 |

FOREIGN PATENT DOCUMENTS

| JP | 2002/055239 A | * | 2/2002 |
|---|---|---|---|
| WO | WO 99/00685 | | 1/1999 |
| WO | WO 00/72478 A2 | | 11/2000 |

* cited by examiner

Primary Examiner—Mark Hellner
(74) Attorney, Agent, or Firm—Kudirka & Jobse, LLP

(57) ABSTRACT

A photonic crystal amplifier that employs a photonic crystal gain medium for a telecommunications system. Pump light is coupled into the amplifier at one end of the gain medium and signal light is coupled into and out of the amplifier at an opposite end of the gain medium. The pump light input end includes a wavelength reflector that reflects the signal wavelengths of light, but transmits the pump wavelengths of light. The signal light input/output end includes a pump wavelength reflector that reflects the pump wavelengths back into the gain medium, but is transparent to the signal wavelengths. The diameter of the gain medium is relatively large, but only allows a single mode to propagate at the pump and signal wavelengths.

26 Claims, 1 Drawing Sheet

PHOTONIC CRYSTAL AMPLIFIER FOR OPTICAL TELECOMMUNICATIONS SYSTEM

CROSS REFERENCE TO RELATED APPLICATIONS

This application benefits from the priority date of U.S. Provisional Application U.S. Ser. No. 60/277,218, filed Mar. 19, 2001, entitled "Low Cost Photonic Crystal Amplifier".

BACKGROUND OF THE INVENTION

1. Field of the Invention

This invention relates generally to a photonic crystal gain amplifier for a telecommunications system and, more particularly, to a photonic crystal gain amplifier for an optical telecommunications system, where the amplifier employs a photonic crystal gain medium that only allows a fundamental mode to propagate therethrough at both the pump and signal wavelengths, and where the mode field diameter at both wavelengths is much wider than the corresponding mode fields present in a fundamental-mode fiber.

2. Discussion of the Related Art

Optical communications systems employ optical transmission fibers to transmit optical signals carrying information over great distances. An optical fiber is an optical waveguide including a core having one index of refraction surrounded by a cladding having another, lower, index of refraction so that light signals propagating down the core at a certain angle of incidence are trapped therein. Typical optical fibers are made of high purity silica including certain dopant atoms that control the index of refraction of the core and cladding.

The optical signals are separated into optical packets to distinguish groups of information. Different techniques are known in the art to identify the optical packets transmitted through an optical fiber. These techniques include time-division multiplexing (TDM) and wavelength-division multiplexing (WDM). In TDM, different slots of time are allocated for the various packets of information. In WDM, different wavelengths of light are allocated for different data channels carrying the optical packets. More particularly, sub-bands within a certain bandwidth of light are separated by predetermined wavelengths to identify the various data channels.

When optical signals are transmitted over great distances through optical fibers, attenuation within the fibers reduces the optical signal strength. Therefore, detection of the optical signals over background noise becomes more difficult at the receiver. In order to overcome this problem, optical fiber amplifiers are positioned at predetermined intervals along the fiber, for example, every 80–100 km, to provide optical signal gain. Various types of fiber amplifiers are known that provide an amplified replica of the optical signal, and provide amplification for the various modulation schemes and bit-rates that are used.

A popular optical fiber amplifier for this purpose is an erbium doped fiber amplifier (EDFA) that provides optical amplification over the desired transmission wavelengths. EDFAs are common because erbium atoms provide light amplification over a relatively broad wavelength range, for example, 1525–1610 nm. The erbium-doped fiber within the EDFA is pumped by a pump laser at a certain excitation frequency, such as 980 nm or 1480 nm. These wavelengths are within the absorption band of the erbium, and results in the generation of optical gain in the wavelength range of 1550 nm. Thus, for an optical signal with a center wavelength at about 1550 nm propagating through the erbium-doped fiber, the signal is amplified by the stimulated emission of 1550 nm energy when the fiber is pumped by a 980 nm pump source. The pump light is absorbed by the erbium atoms that cause electrons in the atoms to be elevated to higher states. When a photon in the optical signal being transmitted hits an excited erbium atom, a photon of the same wavelength and at the same phase is emitted from an elevated electron, which causes the electron to decay to a lower state to again be excited to a higher state by the pump photons. The optical signal is amplified by the generation of additional photons in this manner.

Another type of fiber amplifier sometimes employed in a fiber communications link is a Raman amplifier. A Raman amplifier provides amplification within the fiber itself by launching pump light into the fiber from a pump source. The pump light raises the energy state of electrons in the dopant atoms within the fiber that then emit light at the wavelength of the optical signal. Semiconductor lasers are generally used in the pump source to generate the pump light, and a wavelength division multiplexer (WDM) is used to couple the pump light into the fiber. Typically, the wavelength of the pump light is about 100 nm less than the wavelength of the signal light to provide the amplification. For example, to amplify signal light in the C and L bands (1520–1600 nm), lasers generating pump light in the 1420–1500 nm wavelengths are used.

The pump light can be launched in either the co-propagating or counter-propagating direction relative to the propagation direction of the optical signal. However, counter-propagating pump light typically has advantages over co-propagating pump light. Most optical communications systems employing Raman amplification take advantage of the counter-propagating pump configuration, where the pump light propagates in the opposite direction to the signal light. Counter-propagating the pump light has the advantage of vastly reducing the amount of pump noise transferred onto the signal channels, as well as minimizing the problem of pump-mediated cross-talk. As reach and information capacity of transmission systems are pushed into even higher limits, the desire to utilize both co-propagating and counter-propagating Raman pump configurations is increasing. Co-propagating Raman pumping gives system performance benefits because the signal powers are maintained at a more uniform power level to route each span of the system.

Another type of optical fiber amplifier employs photonic crystals as the gain medium in the amplifier. Two dimensional photonic crystals are materials containing periodically varying indices of refraction which limit the number of optical modes that are allowed to propagate in much the same way that a fiber has a limited number of allowable modes. Typically, two-dimensional photonic crystals are constructed with periodically spaced air gaps (holes) or layers of different materials or lattice sites that provide a periodic array of refractive index variation. For example, photonic crystal fibers (PCF) are constructed with periodic air holes in a cross-section which runs the length of the fiber, creating a photonic crystal with axial symmetry. A light signal will propagate in a fundamental mode in the central region of the fiber guided by the array of periodic holes or lattice sites formed adjacent to or surrounding the central core region. PCFs have been built with core diameters that are greater than 10 times that of a normal fundamental mode fiber, where all wavelengths above approximately 500 nm propagate as a fundamental mode.

A discussion of photonic crystal fibers can be found in T. A. Birks et al., "2-D Photonic Bandgaps in Silica/Air Structures," Electronic Letters Vol. 31 (22) pp. 1941–1943, Oct. 26, 1995; J. C. Night et al., "Pure Silica Single Mode Fiber with Hexagonal Photonic Crystal Cladding" Proceedings of OFC, pp. pd 3–1-pd 3–5, February, 1996; J. D. Joannopoulous et al., "Photonic Crystals: Moulding the Flow of Light," Chapter 5, Princeton University Press, 1995; and U.S. Pat. Nos. 5,784,440; 5,802,236; 6,097,870 and 6,175,671.

Bulk optical amplifiers employing a photonic crystal are typically separated into two types. A first type includes those amplifiers that collimate or otherwise focus the pump beam before entering the gain medium, and a second type that uses the wave guiding properties of a narrow gain region to avoid the need for pump collimation. Those designs that employ the first type require very precise optical alignment and complex beam-circularization optics, since pump laser sources provide outputs that are highly divergent, elliptical beam profiles, which is counter to the design of a low cost amplifier. Those designs that employ the second type do not require complicated optics for pump collimation, but suffer from poor performance because the pump and signal mode fields have poor overlaps, thus much of the pump beam is wasted in the regions where there is no signal beam, and the size of the gain medium is limited by the prohibitive pump power required to achieve the necessary power densities as the waveguide cross-section increases.

One of the unique properties of axial photonic crystals is that they propagate a fundamental or single mode of a much larger lateral size and broader wavelength range than is achievable in a conventional fundamental mode optical fiber. International Publication No. WO 99/00685, titled "Single Mode Optical Fibre," published Jan. 7, 1999, discloses a PCF where the core diameters are in the range of 50 Tm to 75 Tm where the light propagating in the core region is maintained in the fundamental mode. The standard fiber has a core diameter of 6 Tm. Such large core PCFs may be employed as bulk amplifiers for signal amplification in optical telecommunications systems for transmission of data signals. Other related articles include J. C. Night et al., "Large Mode Area Photonic Crystal Fiber," Electronic Letters, Vol. 34 (13), pp. 1347–1348, Jun. 25, 1998 and W. J. Wadsworth et al., "YB$^{3+}$-Doped Photonic Crystal Fiber Laser," Electronic Letters, Vol. 36 (17), pp. 1452–1454, Aug. 17, 2000.

Because PCFs have such a large core region as compared to conventional single mode fibers, the term "photonic crystal fiber" may be somewhat of a misnomer in that these crystals function more in a bulk with a periodic waveguiding mechanism than as a fiber with a continuous waveguide mechanism in the form of a cladding. Herein, photonic crystals are referred to as a photonic crystal medium or, with the addition of a rare earth dopant in a core region, a photonic crystal gain medium.

SUMMARY OF THE INVENTION

In accordance with the teachings of the present invention, a photonic crystal amplifier is disclosed that employs a photonic crystal gain medium for a telecommunications system. Pump light is coupled into a core region of the amplifier at one end of the gain medium and signal light is coupled into and out of the amplifier at an opposite end of the gain medium. The pump light input end includes a wavelength reflector that reflects the signal wavelengths of light, but transmits the pump wavelengths of light. The signal light input/output end includes a pump wavelength reflector that reflects the pump wavelengths back into the gain medium, but is transparent to the signal wavelengths. Therefore, both the pump light and the signal light pass twice through the gain medium for enhanced gain.

The diameter of the core region of the gain medium is relatively large, but allows only a single mode to propagate at the pump and signal wavelengths. Because the photonic crystal medium allows both the pump and signal wavelengths to propagate as fundamental modes, they will have good overlap through the gain medium, providing greater amplification per length of the gain medium.

Additional objects, advantages, and features of the present invention will become apparent from the following description and appended claims, taken in conjunction with the accompanying drawings.

DETAILED DESCRIPTION OF THE EMBODIMENTS

The following discussion of the embodiments of the invention directed to the use of a photonic crystal gain amplifier in a fiber telecommunications system is merely exemplary in nature, and is in no way intended to limit the invention or its applications or uses.

Figure 1:
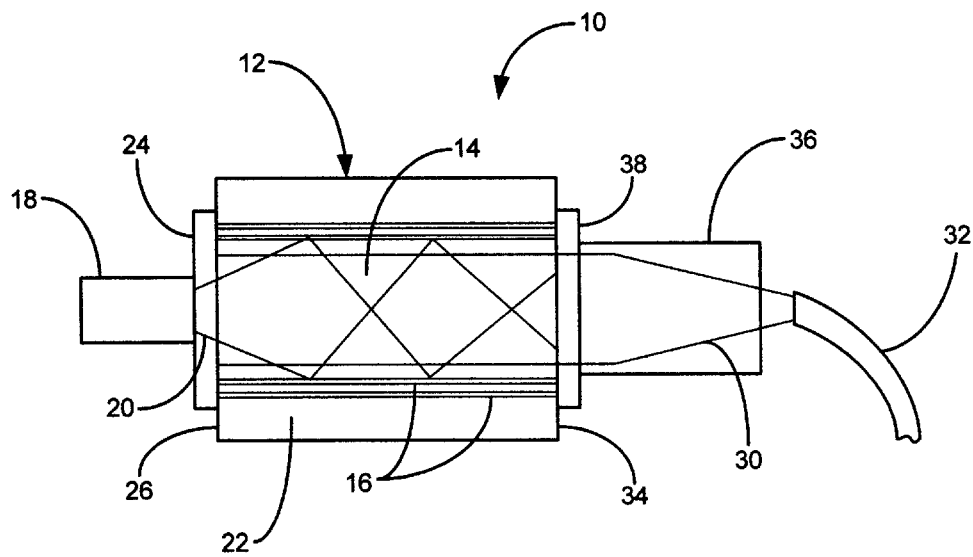
FIG. 1 is a cross-sectional view of a photonic crystal gain amplifier, according to an embodiment of the present invention.

FIG. 1 is a cross-sectional view of a photonic crystal gain amplifier 10 (PCGA), according to an embodiment of the present invention. The amplifier 10 includes a photonic crystal gain medium 12 that amplifies light, as will be discussed in more detail below. In one embodiment, the gain medium 12 is a glass or silica material that is doped with a suitable emissions dopant, such as erbium, ytterbium or thalium, to provide the light amplification. As will be appreciated by those skilled in the art, the gain medium 12 can be made of other suitable materials.

The gain medium 12 includes a core region 14 through which light propagating therethrough is confined. A series of channels 16 are formed longitudinally through a cladding layer 22 around the core region 14 of the gain medium 12. The channels 16 are filled with a material having a different index of refraction than the index of refraction of the rest of the material of the gain medium 12 to limit the propagation modes for the desirable light wavelengths in the core region 14 to the fundamental modes. The channels 16 may be filled with a second material that is a solid, liquid or gas, and the channels 16 may be air or a vacuum. In an alternate embodiment, the gain medium 12 may include many core regions to increase amplifier efficiency. The core region spacing could be equal to a lens array for mass production purposes.

The wavelengths of light for the pump light 20 and the signal light 30 would be any wavelengths suitable for amplification purposes, as would be well understood to those skilled in the art, and would be application specific for the particular medium 12 and dopant. This technique for limiting the propagation modes to a fundamental mode in a photonic crystal gain medium is well known to those skilled in the art, as discussed above.

A pump source 18, for example, a semiconductor laser, generates pump light 20 that enters the gain medium 12 through a signal filter or reflector 24. The pump source 18 is optically coupled to the reflector 24, and the reflector 24 is optically coupled to an end 26 of the medium 12 so that the pump light 20 readily propagates from the source 18 through the reflector 24 and into the medium 12 with minimal reflections. In an alternate embodiment, a simple pseudo-collimating lens (not shown) can be used to couple the pump light 20 into the medium 12 to enhance pump-crystal efficiency. Also, the pump source 18 can be a multi-mode pump source generating multi-mode pump light to provide a broader spectrum to alleviate certain pump wavelength dependence problems.

Signal light 30 from an optical fiber 32 enters the gain medium 12 through an opposite end 34 of the medium 12 to the pump source 18. The signal light 30 is collimated by a collimating lens 36 before entering the medium 12. The collimating lens 36 can be any coupling lens suitable for the purposes described herein, such as a GRIN lens. The collimated signal light 30 propagates through a pump filter or reflector 38 and into the gain medium 12. The fiber 32 is optically coupled to the lens 36, the lens 36 is optically coupled to the reflector 38, and the reflector 38 is optically coupled to the end 34 of the gain medium 12 so that the signal light 30 propagates therethrough with minimal reflections.

The signal reflector 24 reflects the signal light wavelengths, and the pump reflector 38 reflects the pump light wavelengths so that both the signal light 30 and the pump light 20 propagate through the length of the gain medium 12 twice. The signal light 30 is transmitted through the core region 14 of the gain medium 12 where it is amplified and reflected by the signal reflector 24. The amplified signal light 30 then propagates back through the reflector 38 and the lens 36 to be coupled into the fiber 32. In an alternate embodiment, the signal reflector 24, the pump reflector 38 and/or the gain medium 12 can be spectrally selective to provide a gain flattening filter (GFF), known to those skilled in the art.

As is known in the art, the pump light 20 excites the electrons in the dopant atoms in the medium 12, which then emit light at the wavelength of the signal light 30, and in phase therewith, to provide the amplification. Because the diameter of the gain medium 12 is significantly larger than fundamental mode fibers, greater amplification can occur therein. The gain medium 12 is designed so that only a fundamental mode of both the pump light 20 and the signal light 30 propagate therethrough. The diameter or size of the collimated, fundamental mode signal light 30 must match the diameter or size of the gain medium 12 to minimize coupling losses.

In one embodiment, the gain medium 12 has a diameter of about 50 $\mu$m-75 $\mu$m, and a length in the range of about 1 cm to 15 cm. However, this is by way of a non-limiting example in that the gain medium 12 can have other suitable dimensions for different applications. Because of the large mode size of the gain medium 12, the pump source 18 can be easily butt-coupled to the signal reflector 24. The diameter of the collimated fundamental mode of the signal light 30 must match the fundamental mode of the crystal gain medium 12 to minimize coupling losses. Therefore, the largest practical collimated signal beam which can be produced places a limit on the maximum mode field diameter of the gain medium 12.

As discussed above, the pump source 18 can be directly butt-coupled to the gain medium 12 to excite the fundamental mode propagation inside the medium 12. This is a significant simplification over current designs requiring the pump source to be coupled to a fiber, or to be optically circularized and highly collimated to meet the requirements for high efficient coupling. The mode field within the photonic crystal medium 12 must be large enough to accommodate the butt-coupled, highly divergent pump light 20. The embodiment of FIG. 1 shows the single pump source 18, but because of the large mode fields available within the gain medium 12, the source 18 can be multiple large laser diode pump chips or laser diode arrays since they could more easily be directly butt-coupled with sufficiently efficient coupling of the pump light 20.

Because the crystal gain medium 12 allows both the pump light 20 and the signal light 30 to propagate as fundamental modes, they will have good overlap throughout the gain medium 12, providing much more efficient amplification than for a large fiber in which multiple pump modes would exist. The typical diameters of the pump and signal fundamental modes are much larger than for a single mode fiber, allowing greater amplification per length of the gain medium 12. By constructing the crystal gain medium 12 from special codoped materials, such as erbium-ytterbium doped glass, higher concentration levels of doping can be achieved and a large pump absorption can be attained, both of which will increase the gain per unit length of the amplifier 10. Also, the core region 14 may be doped with other single or co-doped rare earth metals, such as erbium.

Figure 2:
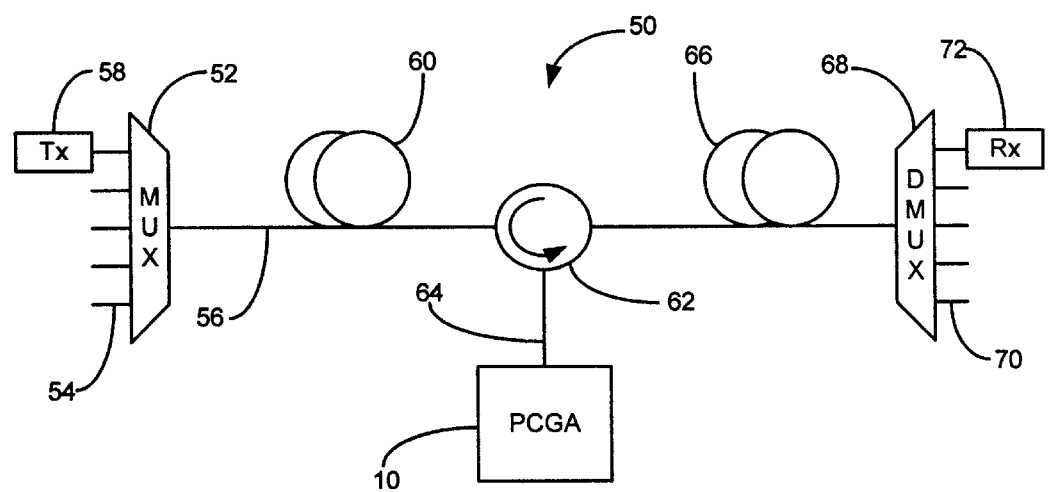
FIG. 2 is a block diagram of a telecommunications network employing a transmission fiber link and a photonic crystal gain amplifier of the type shown in FIG. 1 in the link.

FIG. 2 is a block diagram of a transmission system 50 employing the photonic crystal amplifier 10. The system 50 includes a multiplexer 52 that receives a plurality of optical signals on input lines 54 from a series of transmitters 58 (one of which is shown) for separate transmission channels, and outputs the optical signals on a single transmission fiber link 56. A fiber span 60 represents a length of the link 56, for example, 50–100 km. A circulator 62 is provided to direct the optical signal onto a fiber 64, which represents the fiber 32. As is known in the art, a circulator is a passive multi-fiber junction that directs or routes an incoming signal into another fiber. The signal on the transmission link 56 is directed from the link 56 to the fiber 64 through the circulator 62, where it is amplified in the amplifier 10 in the manner as described above. The amplified optical signal is directed back through the fiber 64 to the circulator 62, where it is then directed back onto the fiber link 56 so that it propagates in its original direction. The amplified optical signal then propagates across another fiber span 66. The fiber link 56 is coupled to a demultiplexer 68 that demultiplexes the signals on the link 56 to multiple output channels 70. The signals on the channels 70 are directed to one of a plurality of receivers 72, one of which is shown here. In other designs, a plurality of amplifiers 10 can be provided along the link 56 that act as optical repeaters.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An optical amplifier comprising:
   a photonic crystal gain medium having a first end and a second end, said gain medium including a core region extending between the first end and the second end for guiding light therethrough;
   a first filter optically coupled to the first end of the gain medium;

at least one pump source optically coupled to the first filter opposite the gain medium, said pump source generating a pump beam having a first center wavelength, said first filter being transparent to the first center wavelength to allow the pump beam to enter the gain medium and propagate through the core region;

a second filter optically coupled to the second end of the gain medium, said second filter reflecting the pump beam; and a signal source positioned proximate the second filter, said signal source generating a signal beam having a second center wavelength, said second filter being transparent to the second center wavelength so that the signal beam is directed into the gain medium through the second filter, and said first filter reflecting the second center wavelength, wherein the pump beam and the signal beam propagates twice through the core region and wherein the pump beam amplifies the signal beam therein.

2. The amplifier according to claim 1 wherein the gain medium controls the size and number of propagation modes of the pump beam and the signal beam.

3. The amplifier according to claim 2 wherein the gain medium limits the propagation modes of the pump beam and the signal beam to their fundamental propagation mode.

4. The amplifier according to claim 1 wherein a size of the gain medium is matched to a size of the signal beam to be amplified.

5. The amplifier according to claim 1 further comprising a coupling lens disposed between the signal source and the second filter, said coupling lens coupling the signal beam into the gain medium.

6. The amplifier according to claim 5 wherein the coupling lens matches the size of the signal beam to a larger size of the gain medium.

7. The amplifier according to claim 5 wherein the coupling lens is a collimating lens that collimates the signal beam before it enters the gain medium.

8. The amplifier according to claim 7 wherein the collimating lens is a GRIN lens.

9. The amplifier according to claim 1 wherein the gain medium is doped with a rare earth element.

10. The amplifier according to claim 9 wherein the dopant is selected from the group consisting of erbium, ytterbium, thalium and combinations thereof.

11. The amplifier according to claim 1 wherein the gain medium has a length in the range of about 1 cm to about 15 cm.

12. The amplifier according to claim 1 wherein the core region has a diameter in the range of 50 $\mu$m to 75 $\mu$m.

13. The amplifier according to claim 1 wherein the core region is defined by a plurality of channels surrounding the core region extending longitudinally through the gain medium, said channels being filled with a material having a different index of refraction than the index of refraction of the core region.

14. The amplifier according to claim 13 wherein the channels are filled with a material selected from the group consisting of solids, liquids and gases, including air and vacuum.

15. The amplifier according to claim 1 wherein the at least one pump source is at least one laser diode source.

16. The amplifier according to claim 15 wherein the at least one laser diode source is an array of laser diodes.

17. The amplifier according to claim 1 wherein the at least one pump source is a plurality of pump sources.

18. The amplifier according to claim 1 wherein the at least one pump source is butt-coupled to the first filter.

19. The amplifier according to claim 1 wherein the signal source is an optical fiber.

20. The amplifier according to claim 19 wherein the optical fiber is coupled to a transmission link fiber associated with a telecommunications system.

21. The amplifier according to claim 20 wherein the optical fiber is coupled to the transmission link fiber through an optical circulator.

22. An optical amplifier for amplifying an optical signal, said amplifier comprising:

a photonic crystal gain medium having a first end and a second end, said gain medium having a fundamental guided mode size larger than a fundamental mode size of the optical signal in a single mode optical fiber;

at least one pump source for coupling pump light into the gain medium, in order to provide optical gain for the optical signal within the gain medium, and reflector filters disposed at the first end and the second end of the gain medium that are either reflective or transparent to the pump light wavelengths and the optical signal wavelengths so that the pump light and optical signal propagate twice through the gain medium;

wherein the gain medium supports only single guided mode propagation for both the optical signal and the pump light.

23. An optical transmission system for transmitting an optical signal, said system comprising:

an optical transmission fiber for transmitting the optical signal; and an optical fiber amplifier coupled to the transmission fiber, said optical amplifier including a photonic crystal gain medium having a first end, a second end and a core region extending between the first end and the second end for guiding light therethrough, said amplifier further including a first filter optically coupled to the first end of the gain medium and at least one pump source optically coupled to the first filter opposite the gain medium, said at least one pump source generating a pump beam having a first center wavelength, wherein the first filter is transparent to the first center wavelength to allow the pump beam to enter the gain medium and propagate through the core region, said amplifier further including a second filter optically coupled to the second end of the gain medium, said second filter reflecting the pump beam, said optical signal being directed into the second end of the gain medium through the second filter from an amplifier fiber to be amplified therein, said first filter reflecting the optical signal and said optical signal being directed out of the gain medium through the second filter and into the amplifier fiber.

24. The system according to claim 23 further comprising an optical circulator, said optical circulator coupling the optical signal from the transmission fiber to the amplifier fiber, and coupling the amplified optical signal from the optical fiber to the transmission fiber.

25. The system according to claim 23 further comprising a multiplexer, said multiplexer being responsive to a plurality of optical input signals and multiplexing the optical input signals onto the transmission fiber.

26. The system according to the claim 25 further comprising a demultiplexer, said demultiplexer demultiplexing the optical signals on the transmission fiber into a plurality of output channels.

* * * * *